Patented Oct. 5, 1937

2,094,935

UNITED STATES PATENT OFFICE 2,094,935

SHELLAC-RUBBER HYDROHALIDE COMPOSITIONS

Herbert A. Winkelmann, Chicago, Ill., assignor to Marbon Corporation, a corporation of Delaware No Drawing. Application July 24, 1936, Serial No. 92,449

8 Claims. (Cl. 106—23)

This invention relates to a resin composition. More particularly it relates to compositions of rubber hydrohalides and shellac.

I have found that rubber hydrochlorides and shellac may be combined to give compositions having unique and useful properties. The compositions in general have the properties of hardness, flexibility, toughness and strength, resiliency and high oil and water resistance. One of the most valuable characteristics of shellac is its property of increasing the surface hardness of rubber hydrochloride compositions. On the other hand the rubber hydrochloride is a remarkable plasticizer for the shellac. The compositions are useful alone and with binders for various molded articles of manufacture. Dispersions of the compositions in volatile solvents give valuable paints and lacquers.

The mixtures of rubber hydrochloride and shellac may be made in various ways. I have found that it is of advantage to mill the shellac into rubber, calender the composition into sheets of say .02" thickness and then react these sheets with hydrogen chloride. By reacting the sheets with gaseous hydrogen chloride at elevated temperatures of say 110° C. an insoluble type product of high oil resistance is obtained which is adapted particularly for molding into shaped articles of manufacture. By the use of liquefied hydrogen chloride at low temperatures of viz. —85° C. an amorphous soluble type of product is obtained particularly adaptable for lacquers. The incorporation of the shellac prior to the reaction gives a composition which is more readily milled and molded than if the rubber hydrochloride is milled and the shellac then dispersed into the rubber hydrochloride. This latter method, however, may be carried out. It has been found that in either case the presence of the shellac aids in the incorporation of other materials, and also aids in the "making" or sheeting of the rubber hydrochloride. Shellac is, therefore, a milling plasticizer or homogenizing agent for rubber hydrohalides. It has also been found that these milled or fluxed rubber hydrochloride-shellac compositions form dispersions with benzol, toluol and like solvents of the benzene series of unexpectedly lower viscosity than rubber hydrochloride dispersions of equal concentration which do not contain shellac. The following examples will illustrate my invention:

*Example I—(Lacquers and other liquid compositions)*

100 parts by weight of amorphous soluble type rubber hydrochloride are fluxed with 10 parts of magnesium oxide on a mill and to the fluxed mixture is added 25 parts by weight of shellac. The shellac readily disperses into the mass forming a homogeneous solid dispersion. To this solid dispersion is added toluene, benzol, or the like with agitation. A uniform, readily flowable dispersion of the mixture is obtained which is apparently a solution or colloidal dispersion of the combined rubber hydrochloride-shellac composition. The solution may be coated on wood, metal or any surface and on evaporation of the solvent leaves an adhesive, tough, hard, protective coating resistant to water, and chemicals such as bleaching solutions, salt, dilute sulphuric acid. The solutions may also be cast into flexible, self-sustaining sheets suitable for wrapping purposes, or laminating purposes.

*Example II—(Shaped articles)*

The following is an example of a composition particularly adapted for tiling:

100 parts of crystalline saturated rubber hydrochloride obtained by reacting undissolved spaced sheet rubber with gaseous hydrogen chloride at —10° C. is fluxed on a mill with 15 parts of magnesium oxide or other basic stabilizer. To the fluxed mass on the rolls is added 25 parts of orange shellac, 300 parts of whiting and the milling continued until a uniform mixture is obtained. The mass is then sheeted out, cut to size, and molded at 270° F. into panels. The panels are characterized by strength, oil resistance and a surface which is difficult to scratch or mar. They are particularly valuable for the side walls of refrigerators. In place of whiting, blanc fixe and rayox may be used. For flooring, wood flour, cotton flock and other fillers are satisfactory.

It is to be understood that the proportions may be widely varied from say 10 parts of shellac to 1000 parts of shellac on 100 of rubber hydrochloride without departing from the spirit of the invention. However, for good tensile strength and flexibility the proportion of shellac to rubber hydrochloride should be maintained below about 30 parts by weight per 100 of rubber hydrochloride.

Homogeneous dispersions of rubber hydrochloride-shellac in solvents such as benzol and toluol may be obtained up to about 50 parts of shellac on 50 parts of rubber hydrochloride. With larger proportions of shellac there is apt to be separation. However, for molded products in which high strength is not required the shellac may be in 100 parts to 10 parts of rubber hydrochloride, the rubber hydrochloride acting as a plasticizer and improved bonding agent for any filler which may be added.

All types of rubber hydrohalides, including saturated and partially saturated may be used, but for oil and benzol resistance the saturated crystalline high temperature type is preferred to the amorphous, while for lacquer purposes the soluble type amorphous asymmetrical rubber hydrochloride is preferred. Intermediate types of rubber hydrochloride may also be used for molding purposes and coating purposes.

I claim:

1. A composition of matter comprising a rubber hydrohalide and shellac.

2. A composition of matter comprising a rubber hydrochloride, shellac and a solvent.

3. A composition of matter comprising a rubber hydrochloride and shellac dispersed in a volatile solvent of the benzene series.

4. A composition of matter comprising amorphous rubber hydrochloride, shellac and toluol.

5. A shaped article of manufacture composed of a composition essentially comprising a rubber hydrochloride and shellac.

6. A tile of homogeneous composition and substantial thickness comprising a filler and a binder including a rubber hydrochloride and shellac.

7. A composition for use in the manufacture of tile and the like comprising a calenderable mass including a stabilized rubber hydrochloride and shellac.

8. A liquid composition comprising a homogeneous dispersion of stabilized rubber hydrochloride and shellac in an aromatic hydrocarbon.

HERBERT A. WINKELMANN.